United States Patent [19]

Choi

[11] Patent Number: 5,167,380
[45] Date of Patent: Dec. 1, 1992

[54] TAPE TENSION CONTROL DEVICE FOR A VCR

[75] Inventor: Sung Hoon Choi, Suwon, Rep. of Korea

[73] Assignee: Goldstar Co., Ltd., Seoul, Rep. of Korea

[21] Appl. No.: 625,455

[22] Filed: Dec. 11, 1990

[30] Foreign Application Priority Data

Dec. 13, 1989 [KR] Rep. of Korea .............. 18878/1989

[51] Int. Cl.$^5$ .............................................. G11B 15/43
[52] U.S. Cl. .................................... 242/189; 242/204; 360/96.3
[58] Field of Search ............... 242/189, 188, 204; 360/74.3, 96.3, 96.1

[56] References Cited

U.S. PATENT DOCUMENTS

| | | | |
|---|---|---|---|
| 3,345,457 | 10/1967 | MacLeod | 242/189 |
| 3,380,680 | 4/1968 | Dunsheath et al. | 242/189 |
| 3,533,576 | 10/1970 | Stevens, Jr. et al. | 242/189 |
| 3,580,525 | 5/1971 | Dopner | 242/189 |
| 3,687,531 | 8/1972 | Bogdanowicz | 242/55.19 A |
| 3,969,766 | 7/1976 | Tanaka et al. | 242/189 |
| 5,070,422 | 12/1991 | Sasaki et al. | 360/74.3 |

FOREIGN PATENT DOCUMENTS 57-3256A 1/1982 Japan ................................ 360/96.1

Primary Examiner—Daniel P. Stodola
Assistant Examiner—John Q. Nguyen
Attorney, Agent, or Firm—Birch, Stewart, Kolasch & Birch

[57] ABSTRACT

A tape tension control device for a video cassette tape recorder includes first and second band fixing members for fixing a band, the second fixing member moved by a plate, and a tension arm fixed with a tension post, whereby by slight turning of the second band fixing member by the plate, a tape runs in the review mode while contacting the tension post so that the tape tension is uniformly controlled and maintained.

2 Claims, 2 Drawing Sheets

TAPE TENSION CONTROL DEVICE FOR A VCR

BACKGROUND OF THE INVENTION

1. Field of the Invention

The present invention relates to a tape tension control device for a video cassette tape recorder (hereinafter "VCR") and more particularly, to a tape tension control device for a VCR which enables the tensional force applied to a tape to be controlled even in a review (hereinafter "Rev") mode.

2. Description of the Prior Art

Several types of tape tension control devices for a VCR are well known in the art. One of such tape tension control devices for a VCR is illustrated in FIG. 1 which shows a conventional tape tension control device for a VCR. As shown in FIG. 1, the conventional device for a VCR is structured with a roller 10, a tension arm 2 having a tension post 2a, a projecting piece 2b, a projection 2c and a band fixing hole 2d, and rotatably mounted with an axial pin 3 disposed at the outer side of a reel table 1, a band fixing member 5 to which one end of a band 4 wound around the reel table 1 is fixed, and mounted to the band fixing hole 2d, an elongated hole 6a through which a band fixing member 6 is fixed with a screw 7 and formed at the other end of the band 4, a hooking projection 2e formed at the lower portion of the tension arm 2 resiliently supported by a tensional coil spring 8, and a plate 9 provided with a hooking projection 9a and a projecting piece 9b which are connected to or disconnected from the projecting piece 2b and the projection 2c of the tension arm 2, and mounted at the lower side of the tension arm 2.

In such conventional device as shown in FIG. 1, when the tensional force applied to a tape T becomes larger during the tape running in a play mode, the tension arm 2 rotates clockwise about the axial pin 3 by overcoming the moment of the tensional coil spring 8 and, at this time, the band 4 wound around the reel table 1 is released so that the reel table 1 rotates fast.

On the contrary, in case that the tape tension becomes smaller, since the tension arm 2 is rotated counterclockwise by the spring force of the tensional coil spring 8, the band 4 is closely contacted to the outer peripheral surface of the reel table 1 so that the speed of the rotation of reel table 1 is reduced, thereby maintaining the tensional force of tape constant. Meanwhile, when the tape T is running in a Rev mode, the plate 9 moves to the right and the projecting piece 9b of the plate 9 contacts the projection 2c of the tension arm 2 so that the tension arm 2 rotates clockwise. In this condition, the tape T is released from the tension post 2a as shown in the dotted line of FIG. 1 so as to be run in the friction free state.

However, in such conventional device, there is no problem in a play mode, but since the tape T runs in a state of releasing from the tension post 2a in the review mode, the tape tension cannot be controlled, resulting in the inequality of tape tension. Also, it may cause the tape T to be damaged and thus the picture quality becomes bad. The projecting piece 9b of the plate 9 used in the review mode also impairs the simple structure of the device.

SUMMARY OF THE INVENTION

Accordingly, it is an object of the present invention to provide a tension control device for a VCR which controls the tape tension during a review mode by reducing the tension applied to a tape.

Another object of the present invention is to provide an improved tension control device for a VCR comprises a first band fixing member provided with a pin and a projection which is rotatably mounted at the outer side of a reel table, and a plate provided with a hooking jaw and a stopper both of which are adapted to contact to or release from a pin and a projection of a second band fixing member, thereby rotating the second band fixing member by the contact of the hooking jaw of the plate and the pin of the second band fixing member so as the tape to be loosened.

A further object of the present invention is to provide a tension control device for a VCR, which is simple in construction, inexpensive to manufacture, and easy in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a tape tension control device for a video cassette tape recorder, which comprises first and second band fixing members for fixing a band, the second fixing member moved by a plate, and a tension arm fixed with a tension post, whereby by slight turning of the second band fixing member by the plate, a tape runs in the review mode while contacting the tension post so that the tape tension can be uniformly controlled and maintained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 2:
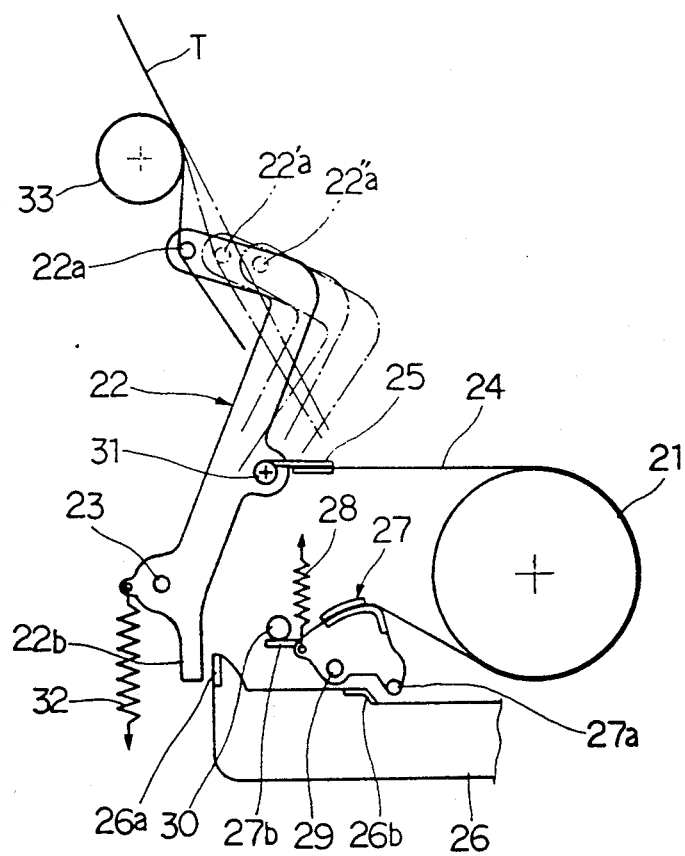
FIG. 2 is a front elevational view of a tape tension control device for a VCR according to the present invention.
Figure 3:
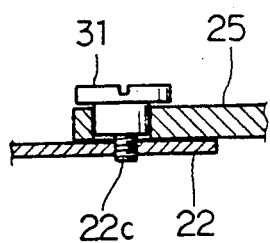
FIG. 3 is a partial sectional view of a fixed state of a tension arm and a first band fixing member of FIG. 2.

Referring now in detail to the drawings for the purpose of illustrating preferred embodiments of the present invention, the tension control device for a video cassette tape recorder as shown in FIGS. 2 and 3, comprises a tension arm 22 provided with a tension post 22a, a projecting piece 22b, and a band fixing hole 22c, and rotatably mounted with an axial pin 23 disposed at the outer side of a reel table 21, a first band fixing member 25 to which one end of a band 24 wound around the reel table 21 is fixed, and mounted in the band fixing hole 22c, a plate 26 mounted at the lower portion of the tension arm 22, a second band fixing member 27 provided with a pin 27a and a projecting piece 27b, and resiliently supported by a tensional coil spring 28 and rotatably mounted by a pin 29, the second band fixing member 27 being adapted to fix another end of the band 24, a stopper 30 mounted to define the clockwise rotation of the second band fixing member 27, a stopping jaw 26a for defining the counterclockwise rotation of the tension arm 22 by contacting to the projecting piece 22b, and a hooking jaw 26b for creating counterclockwise rotation of second band fixing member 27 by contacting the pin 27a of the second band fixing member 27 in the review mode so as to make the tension applied to the tape T loosen. The first band fixing member 25 is fixed on the tension arm 22 through the band fixing hole 22c by means of a screw 31 having an eccentric body for adjusting an initial position of the tension post 22a.

In the drawings, reference numeral 32 denotes a tensional coil spring, and reference numeral 33 is a roller.

The tension control device for VCR of the present invention operates as follows:

When the tape tension becomes larger in a state that the tape T is running in a play mode, the tension arm 22 rotates clockwise to loose the band 24 wound around the reel table 21 so that the rotation speed of the reel table 21 becomes faster. On the contrary, when the tape tension becomes smaller, the tension arm 22 rotates counterclockwise to make the band 24 closely contact the reel table 21 so that the rotation speed of the reel table 21 is reduced, thereby controlling and maintaining the tape tension uniformly.

Meanwhile, when changing over the tape running to a review mode, the plate 26 moves to the right (FIG. 2), and at this time, the hooking jaw 26b of the plate 26 pushes the pin 27a of the second band fixing member 27 so that the second band fixing member 27 rotates counterclockwise, resulting in pulling the band 24. Therefore, the tension arm 22 is rotated clockwise and the position of the tension post 22a moves to a tension post 22'a as shown in the dotted line of FIG. 2.

Figure 1:
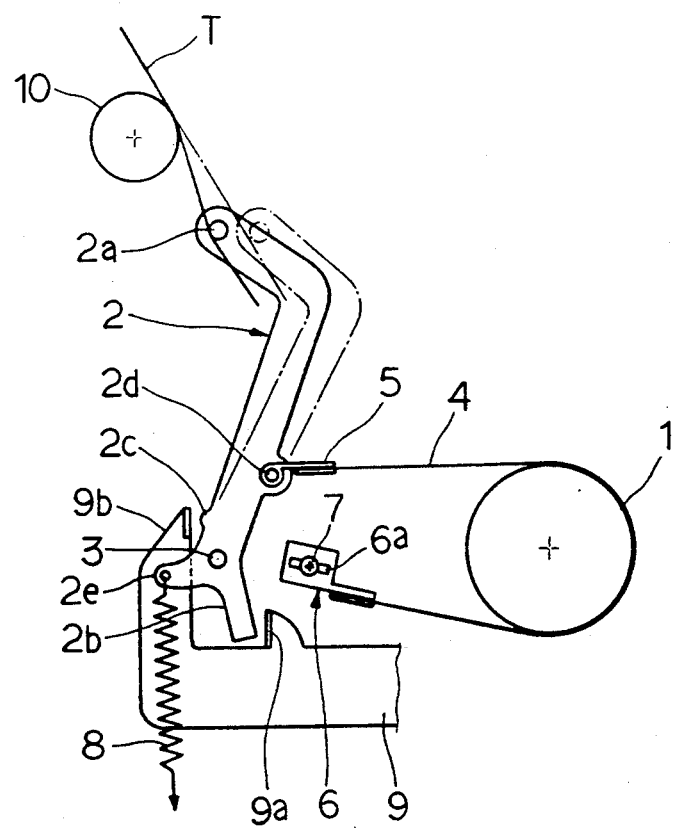
FIG. 1 is a front elevational view of a conventional tape tension control device for a VCR.

That is, as can be seen from the dotted line of FIG. 2, the tension post 22a is located at the position of 22'a where the contacting angle of the tape T against the tension post 22a is smaller than that in the play mode so that the tape tension can be controlled, whereas in the conventional device as in FIG. 1, the tension post 22a is separated from the tape T.

As described in detail, the device of the present invention has the effects that since the position of the tension post is variable by moving the second band fixing member, the tape tension can be controlled even in the review mode.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A tape tension control device for a video cassette tape recorder, which comprises:
   a tension arm contacting a tape to impart tension, said tension arm having a projecting piece and a fixing hole rotatably mounted on said video cassette tape recorder with a first axial pin and disposed at an outer side of a reel table,
   a band wound around said reel table for applying a braking force to said reel table,
   a first band fixing member for fixing one end of said band to said fixing hole with a screw,
   a slidably mounted mode control plate having a stopping jaw for limiting rotation of said tension arm by contacting said projecting piece of the tension arm,
   a second band fixing member having a pin member and a projecting piece resiliently supported by a tension coil spring and rotatably mounted with a second axial pin for fixing a second end of the band,
   a stopper fixed to said video cassette tape recorder for restricting rotation of said second band fixing member by contacting said projecting piece of the second band fixing member, and
   a hooking jaw formed on said mode control plate for rotating the second band fixing member by contacting said pin member of the second band fixing member so as to reduce tension in a tape.

2. The tape tension control device of claim 1, wherein the tension arm contacts the tape via a tension post, and the tension arm and the first band fixing member are coupled to each other by an eccentric screw so that the initial position of the tension post is adjustable.

* * * * *